Feb. 26, 1929.

W. C. STEVENS 1,703,832

TIRE FINISHING MACHINE

Filed April 2, 1924     5 Sheets-Sheet 1

Witness:

Inventor:
WILLIAM C. STEVENS.
By ....... Atty.

Feb. 26, 1929.  
W. C. STEVENS  
1,703,832  
TIRE FINISHING MACHINE  
Filed April 2, 1924  
5 Sheets-Sheet 3

Witness:  
Inventor:  
WILLIAM C. STEVENS  
By  
Atty.

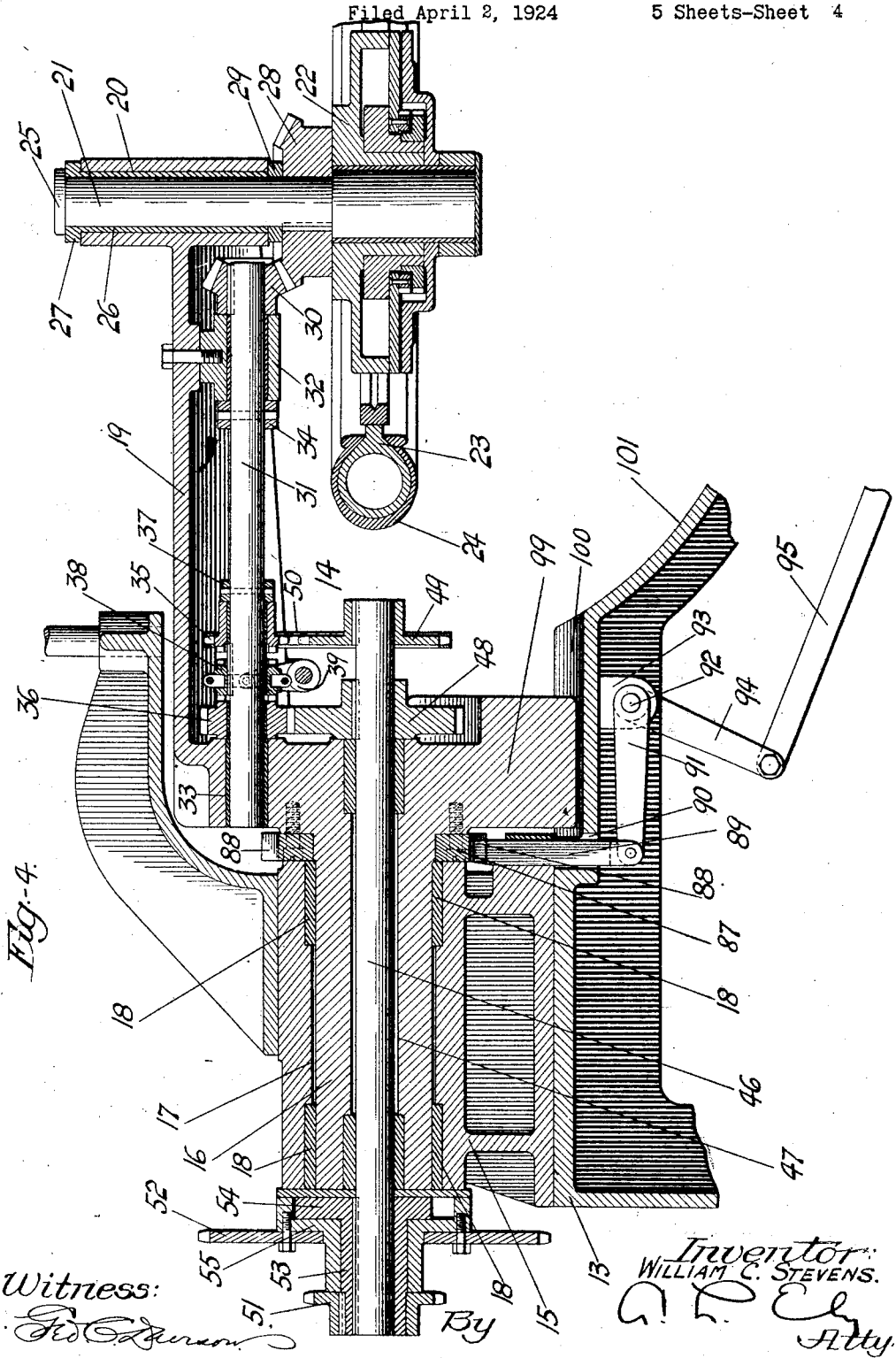

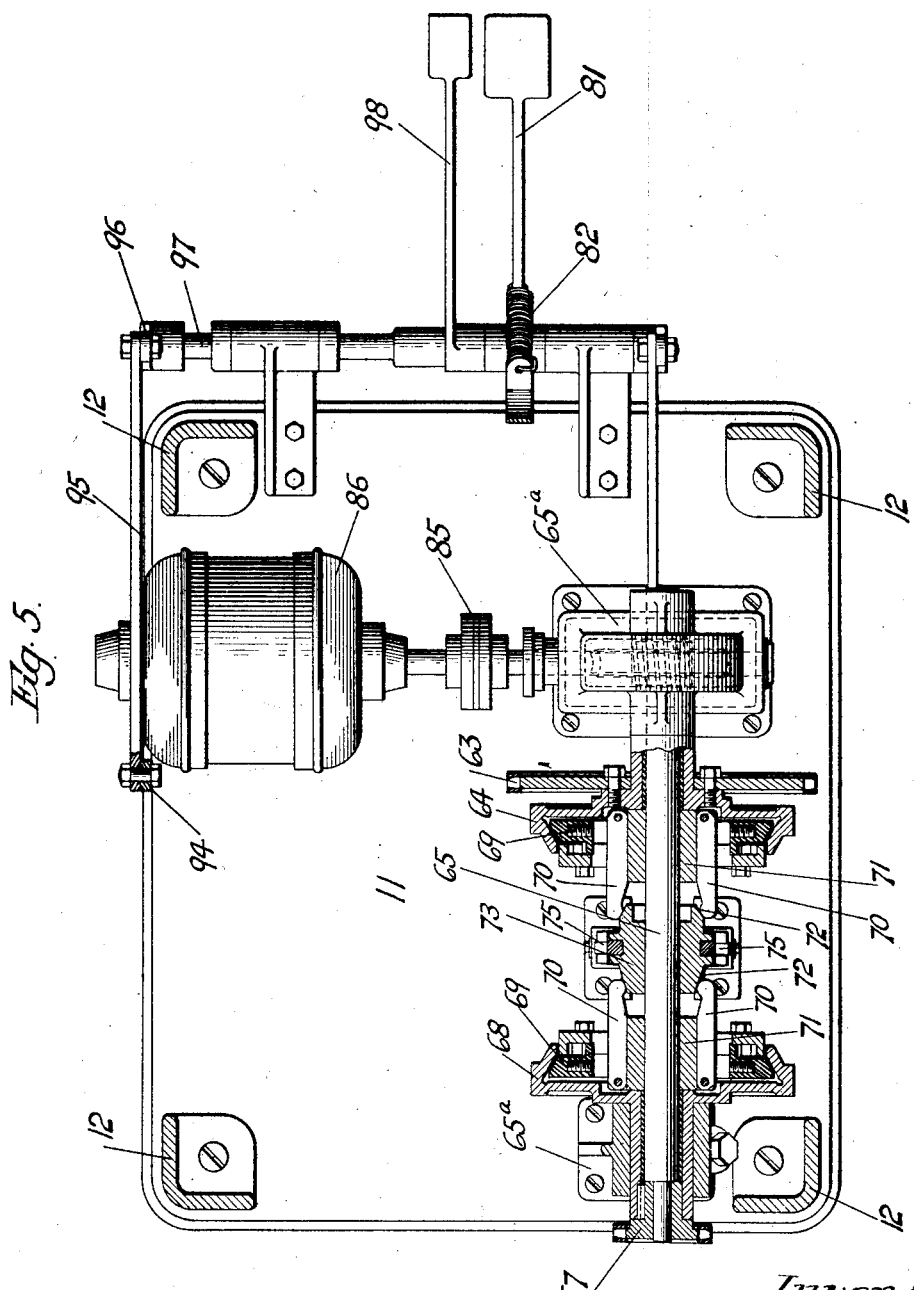

Patented Feb. 26, 1929.

1,703,832

UNITED STATES PATENT OFFICE.

WILLIAM C. STEVENS, OF AKRON, OHIO, ASSIGNOR TO THE FIRESTONE TIRE AND RUBBER COMPANY, OF AKRON, OHIO, A CORPORATION OF OHIO.

TIRE-FINISHING MACHINE.

Application filed April 2, 1924. Serial No. 703,661.

This invention relates to machines for making tires and especially to machines for performing the finishing operations in the building of pneumatic tire casings.

In the manufacture of pneumatic tire casings the carcass of the tire is formed of plies of fabric stretched about an annular core of tire-shape in cross-section and of beads secured to the carcass by wrapping the marginal portions of the plies about the beads. These operations are performed on tire-building machines as will be understood by those skilled in the art and accordingly it is not necessary that they be described here. From the tire building machine the carcass is carried on its core to the "finishers." The finishers apply those portions of the tire known in the art as the bead-chafer strips, the side walls and the tread. The bead chafer strip is a strip of rubberized fabric which is stitched into place about each bead on the carcass, over the marginal portions of the plies which have been wrapped there-around, so as to extend into lapped engagement with the side walls. The side walls are strips of rubber which are applied to the carcass so as to extend from the bead where they over-lap the chafer strip to lapping engagement with the tread. The tread is a strip of tough rubber having a "breaker" strip of fabric therein and it extends about the periphery of the tire and into overlapping engagement with both side walls.

Heretofore, finishing operations such as those described above have been performed on finishing stands adapted to support a core carrying a carcass so that the core may be manually rotated in a vertical plane.

In appying the chafer strips and side walls to a tire so mounted, great difficulty is encountered in attempting to properly affix and stitch the strips in place, the workman usually being required to stoop or sit on a low stool in order to be enabled to work on the side of the tire.

It is the purpose of this invention to provide a machine for finishing tires which is such as will require less hand operation and will have a greater capacity than a number of workmen employing ordinary finishing stands. The chief object of the invention is to provide a universally mounted core-carrying chuck and tire-shaping devices operable onto a core in various positions of the chuck. Other important objects are to provide means for driving a core circumferentially in any position of the chuck, the said means preferably being adapted for operation at two speeds; to provide means whereby the core may be rotated circumferentially in the same direction in reversed positions; to provide a device adapted to simultaneously stitch a bead chafer strip and side wall into place on a tire in horizontal positions of the core and to provide an improved tread stitching device operable toward and from the core when supported in a vertical position.

Other more specific objects will appear from the following detailed description in connection with the accompanying drawings in which the invention is illustrated in its preferred form, it being understood that it is not limited to the specific device illustrated.

Of the accompanying drawings:

Figure 4, is a vertical section in detail of the universal core-carrying head and its mount.

Figure 5, is a section on line 5—5 of Figure 1.

Figure 1:
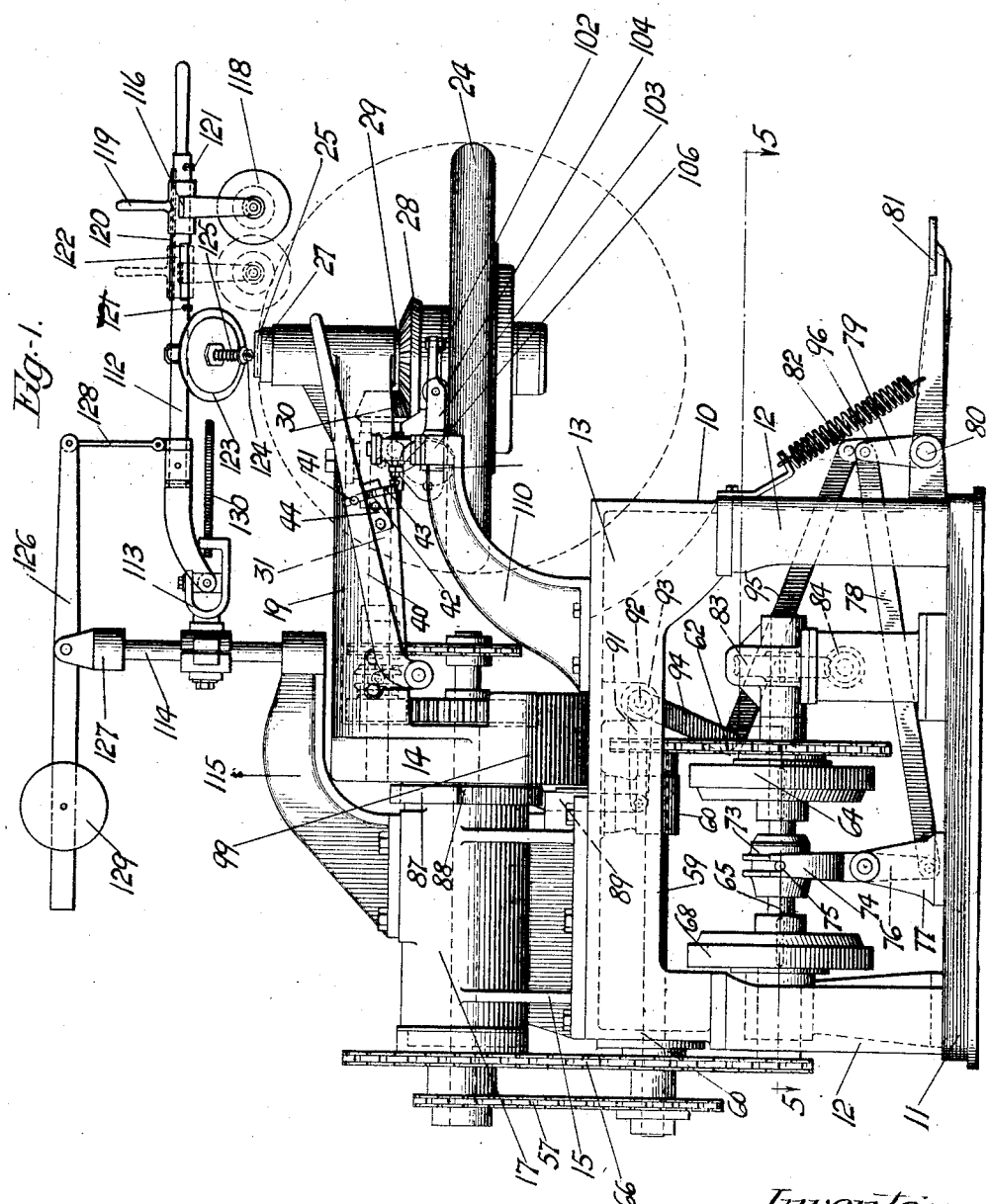
Figure 1, is a side elevation of a machine embodying my invention and illustrating a core carrying a carcass in one of its horizontal positions, the vertical position of the core being indicated in dotted lines.
Figure 2:
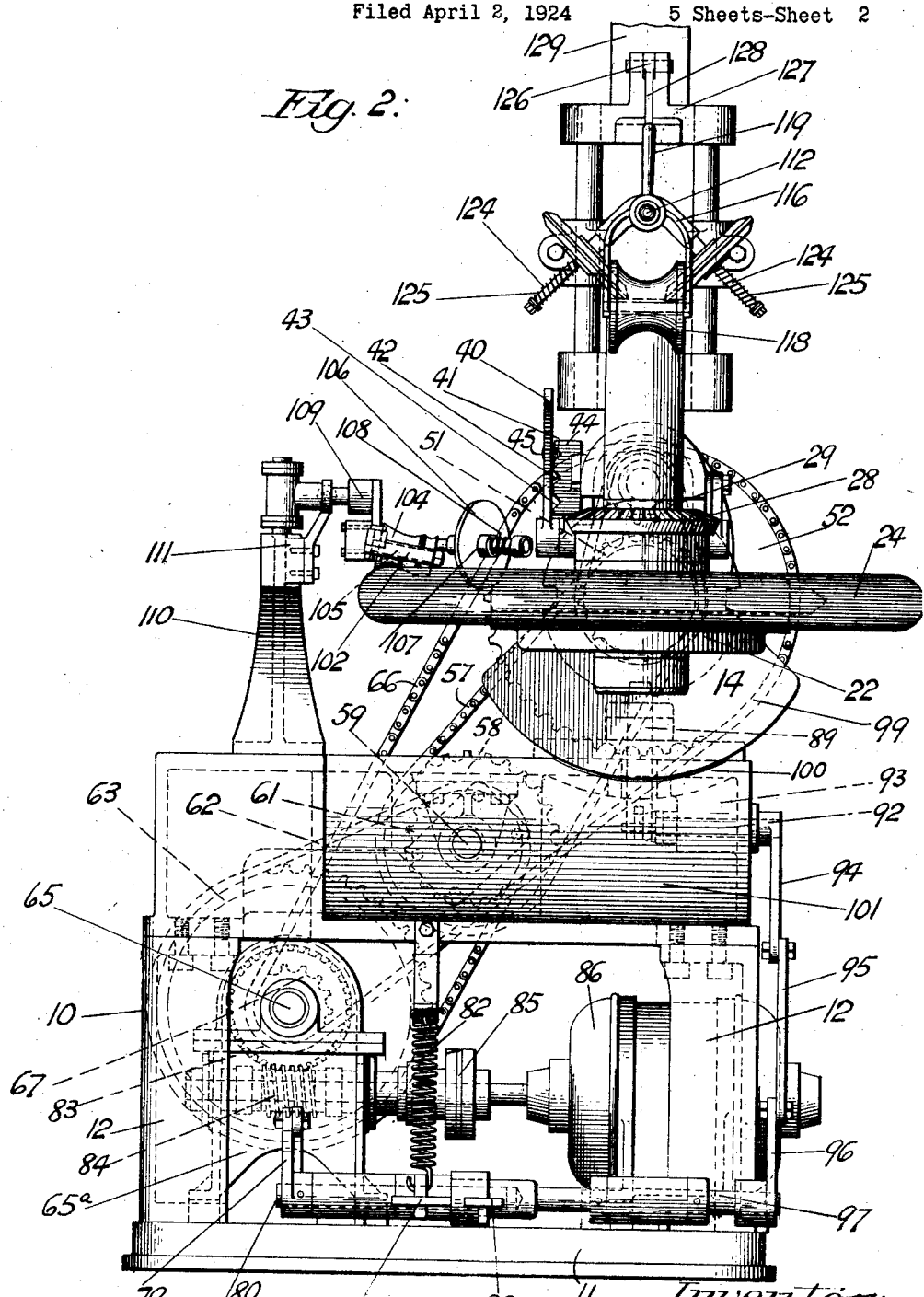
Figure 2, is a front elevation thereof.

Referring to the drawings, 10 is a frame structure or table comprising base-plate 11, legs 12, 12, and platform 13, the platform 13 being raised from the floor sufficiently to support a universal core-carrying head 14 at a convenient height.

*The universal head and core driving elements.*

The head 14 is supported on the table 10 in a bracket 15, the head being formed with a trunnion 16 (Fig. 4) journaled in a bearing 17 formed in the bracket 15. Bushings 18, 18 may be interposed between the trunnion 16 and the bearing 17. A core-carrying arm 19 is formed on the head 14, the arm 19 being substantially a hollow semi-cylinder whereby it will have great strength and will act as a housing for a core-driving means later to be described. The arm 19 has formed in its outer end a transverse bore 20 forming a bearing for a shaft 21 of an expansible chuck 22 adapted removably to receive a core 23 on which is mounted a tire carcass 24. The shaft 21 is formed with an enlarged end 25 adapted to retain the shaft in the bearing 20, a bushing 26 in the bearing 20 being formed with a bearing portion 27 for the enlarged end 25. It is to be understood that the chuck is so positioned that the axis of the head 14 will always pass through the plane of the core in all of its positions.

For driving the core on the head 14 in all positions of the latter, there is provided a bevel gear 28 secured on the chuck shaft 21 between the chuck 22 and the bearing 20, a wear washer 29 preferably being interposed between the gear and the bearing. The bevel gear 28 is in mesh with a bevel gear 30 secured on a shaft 31, journaled in a bearing bracket 32 which is secured to the arm 19 near the outer end and within the hollow portion thereof, and in a bearing 33 formed in the head 14. The gear 30 and a thrust collar 34 are arranged so as to prevent longitudinal motion of shaft 31 in its bearings.

It is desired for a purpose later to be described that the core 23 should rotate in the same direction in reversed positions in a horizontal plane. To this end, the shaft 31 is adapted to be driven in either direction. For this purpose, a drive sprocket 35 and a drive gear 36 are journaled on the shaft 31, the sprocket being held against longitudinal movement relative to the shaft 31 by collar 37 and the gear 36 by the head 14. A shiftable clutch collar 38 is splined on the shaft 31 between the sprocket 35 and the gear 36 and is adapted to be shifted into clutching engagement with each or into a neutral position between the two. For shifting the clutch collar 38 there is provided an arm 39 pivoted to the arm 19 and pivotally connected to the collar 38. The arm 39 is adapted to be operated by a manually operable lever 40 (Fig. 1) secured thereto, the positions of lever 40 to hold the clutch respectively in engagement with gear 36, in neutral position and in engagement with sprocket 35 being determined by notches 41, 42 and 43 in a member 44 secured to the arm 19, a suitable latching device, indicated at 45 on the lever 40, being adapted to engage in the notches 41, 42, or 43.

Driving of the shaft 31 in any position of the head 14 is accomplished by a drive-shaft 46, concentric with the axis of the head, the shaft 46 being journaled in a bore 47 extending through the head 14 and its trunnion 16. A gear 48 is secured on the shaft 46 so as to mesh with the gear 36 and a sprocket 49 is secured on the shaft 46 and has trained thereover a chain 50 for driving sprocket 35.

Shaft 46 is adapted to be driven at two speeds respectively by sprockets 51 and 52. Sprocket 51 is adapted to drive the shaft 46 at hight speed and is positively connected thereto as shown, by being keyed or otherwise secured to a sleeve 53 formed on the plate 54 of a ball clutch which plate 54 is keyed or otherwise secured to the shaft 46. The sprocket 52 is adapted to drive the shaft 46 by being secured to clutch casing 55 to which the sprocket is secured. The ball clutch comprising plate 54 and casing 55 may be of any suitable type the details of which need not be illustrated whereby speed-flexibility of the core is obtained, the core not tending to jerk when changing from high to low speeds or vice versa.

The sprocket 51 is adapted to be driven by a chain 57 trained over a sprocket 58 on a shaft 59 journaled in bearings 60, 60 on frame 10. The shaft 59 is adapted to be driven by a sprocket 61 over which is trained a chain 62 driven by a sprocket 63 secured to a clutch drum 64, the sprocket 63 and drum 64 being journaled on a drive shaft 65 which is mounted in brackets 65ᵃ, 65ᵃ. The sprocket 52 is adapted to be driven by a chain 66 trained over a sprocket 67 secured to a clutch drum 68, the sprocket 67 and drum 68 being journaled on the shaft 65. Any suitable clutches may be used, the specific type shown comprising a drum 64 or 68 (Fig. 5) rotatably mounted on the shaft and formed with cone-shaped inner surface against which are adapted to be forced expanding members 69, 69 which are adapted to be expanded by fingers 70, 70 pivoted on a collar 71 secured to the shaft 65, the fingers being formed on their free ends with rounded surfaces adapted to be engaged by tapered portions 72, 72 on a shiftable collar 73 which is adapted to spread the fingers when moved longitudinally along the shaft. For shifting the collar 73 there is provided a yoke 74 (Fig. 1) engaging studs 75, 75 on the collar and operated by an arm 76 pivoted on a bracket 77 mounted on the base plate 11. The arms 76 is connected by a link 78 to an arm 79 secured on a rock-shaft 80 operable by a pedal 81, a retractile spring 82 being adapted normally to hold the pedal 81 in neutral position. Shaft 65 is driven by a worm gear 83 secured thereon and meshing with a worm 84 journaled in one of the brackets 65ᵃ and driven through a flexible connection 85 by a motor 86 mounted on the base plate.

For securing the head 14 in a plurality of angular positions, an annular disk 87 is secured thereon preferably adjacent the bracket 15 and has in its outer circumference, a plurality of slots 88, 88 so positioned and so spaced as to permit a vertically operable latch 89 to enter a slot to lock the head in any predetermined position. The latch 89 may be operated through a slot 90 in the table by means of an arm 91 secured on a rock shaft 92 mounted in a bracket 93 depending from the under surface of the table 10. An arm 94 is secured on the rock-shaft 92 and is connected by a link 95 to an arm 96 mounted on a rock-shaft 97 adapted to be operated by a pedal 98. The latch 89 is normally urged upwardly and is adapted to release the head 14 for rotation by depression of the pedal 98.

In order that the head 14 may be readily swung from one position to another the weight of the arm 19, the core driving shaft 31, the expansible chuck 22 and its shaft 21, and the core 23 is balanced by a heavy portion or segment 99 formed on the head opposite to the core-carrying arm. In order that the segment will clear the platform 13, a depression 100 is formed in the latter. To permit rotation of the core in a vertical plane the platform 13 is formed with a depression or cavity 101, at its front end.

*Chafer and side-wall stitching device.*

A chafer and side-wall stitching device is provided for applying and shaping on the carcass a composite strip drawn from a reel, (not shown) and comprising a chafer strip and a side-wall strip which previously have been secured together in proper overlapping relation for simultaneous application to the carcass. This device comprises a guide arm 102 pivoted on a bracket 103 so as to be movable over or away from a core supported in a horizontal plane; a stitcher roller 104 journaled on a stud 105 secured on the bracket 103, the roller 104 be shaped, as shown, so as to stitch the side-wall into place and also the portion of the chafer extending over the side of the bead; and a roller disk 106 journaled on a stud 107 secured to the bracket 103, the disk being adapted to be yieldingly pressed against the heel of the bead by spring 108 and to stitch in place the portion of the chafer over the heel of the bead. It is understood that the guide arm 102, stitcher roller 104 and stitcher disk 106 act on the composite strip progressively in the order named to apply it to the tire carcass. The bracket 103 is mounted on an arm 109 which is pivoted on a bracket 110 mounted on the platform 13 so that the bracket 103 may be swung away from the core when not in use. To yieldingly urge the bracket 103 toward the core when in use, a weight 111 is secured on the bracket 103.

*Tread stitching device.*

The tread stitching device comprises a lever 112 pivotally mounted on a bracket 113 vertically adjustable on posts 114, 114 secured in a bracket 115 which is mounted on the bearing portion 17 of bracket 15. Shiftable on the lever 112 is a bracket 116 in which is journaled a concave tread roller 118 and on which is formed a handle 119 by which the bracket 116 is adapted to be shifted. The bracket 116 is prevented from being rocked on the lever 112 by a key 120 or in any other suitable manner. Shifting of the bracket 116 beyond certain limits is prevented by set screws 121, 121. In its tread rolling position, shown in dotted lines in Figure 1, the bracket 116 is permitted to rock longitudinally into a notch 122 formed in the lever under pressure of the roller against the tread to prevent creeping of the bracket during the tread rolling operation. For stitching the edges of the tread into overlapping engagement with the side walls, a pair of stitcher roller disks 123, 123 are journaled on studs 124, 124 on the lever 112, which studs are so disposed that the disks 123 will engage the marginal portions of the tread on opposite sides of the tire, the disks being adapted to yield under pressure against the tire by springs 125, 125 whereby they will feed gradually around the sides of the tire as will be understood by those skilled in the art. The lever 112 is normally urged away from the core by a lever 126 pivoted on a bracket 127 secured on the tops of the posts 114, one arm of the lever 126 being connected by a link 128 to the lever 112 and the other arm having adjustably secured thereon a counter weight 129. For aiding the proper positioning of a tread on a carcass, a sight comprising a coil spring 130 is secured in the bracket 113 so as to project over the center of the tread portion of a carcass on a core in vertical position.

Figure 3:
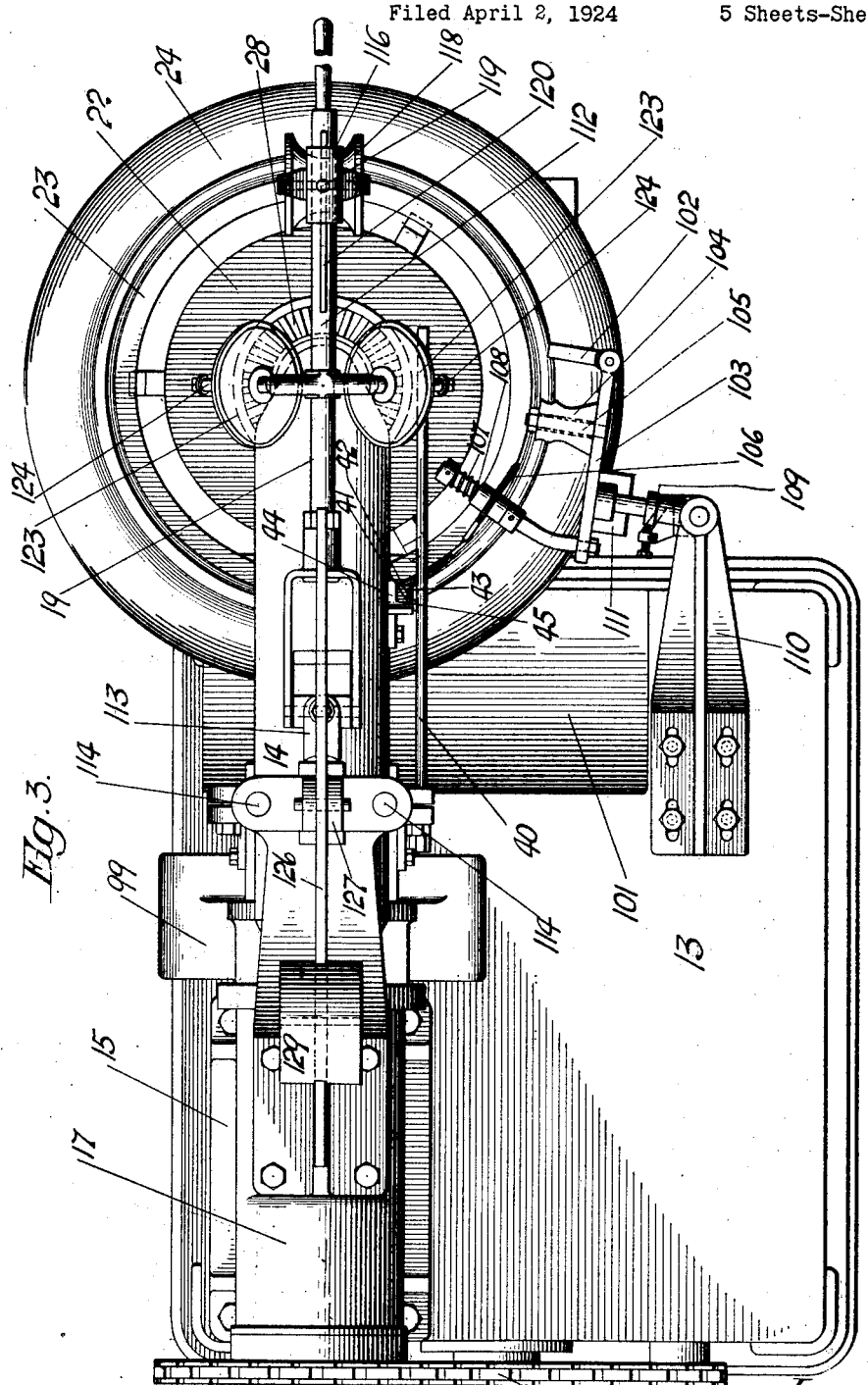
Figure 3, is a plan thereof.

In operation, a core carrying a carcass which has been delivered to the finishing machine from the building machine is mounted on the expansible chuck 22 while the latter is in a vertical position. The head 14 is then rotated to the position shown in Figure 1, the operator depressing pedal 98 to unlock the head by with-drawing latch 89 from a slot 88 so as to start the rotation, the pedal being immediately released so that it will automatically advance into another slot 88 adapted to support the head in the position shown. The composite strip comprising chafer and sidewall is then drawn from a reel (not shown) and the end affixed to the tire in proper position by hand. Side-wall stitcher bracket 103, which has been swung back after a prior stitching action is now swung into the position shown in Figure 1, the weight 111 pressing the roller 104 against the side-wall and the stitcher disk 106 being pressed against the heel of the bead by spring 108. The guide-bar 102 is then swung inwardly over the carcass and the composite strip is held on the upper surface of the bar by hand. The core is then slowly rotated by depressing pedal 81, the lever 40 being engaged in the proper notch 41 or 43 so as to rotate the core clockwise as shown in Figure 3. The composite strip is thus drawn over bar 102, the side-wall and portion of the chafer over the side of the bead being stitched into place by the roller 104 and the marginal portion of the chafer being folded down over the heel of the bead by the disk 106, these operations being performed progressively on the strip as the core rotates. When nearly a complete rotation of the core is made the core is stopped and the strip cut to proper length, usually so as to provide a slight over-lap, the core being again slowly rotated to roll the end of the strip in place.

The other side-wall and chafer are applied in a similar manner the core being unlatched, rotated to reversed horizontal position and relatched as will be understood, the side-wall stitcher being swung back out of the way for this purpose. So that the core will again be driven clockwise, (Fig. 3), in its reversed position, the lever 40 is shifted from notch 41 to 43 or vice versa, as the case may be, so that the core-driving shaft 31 is rotated in reverse direction.

After the second side-wall and chafer have been applied, the head 14 is rotated so that the core will be supported in a vertical position, as shown by dotted lines in Figure 1. A tread band is now applied while the core is slowly rotated, the direction being counterclockwise, as shown in Figure 1, lever 40 being properly positioned for this purpose. The tread band has a line marked on its center which is alined by the workman's eye with the sight 130, the workman stretching and shifting the tread in the usual manner to position it on the carcass.

After the tread has been properly positioned on the carcass the core is rapidly rotated by moving pedal 81 upwardly, suitable means (not shown) preferably being provided to lock the pedal in its upper position to hold collar 73 in engagement with clutch 64. The lever 112 is then manually operated toward the tread with the roller 118 in the position shown in dotted lines in Figure 1, the roller 118 being pressed against the tread to stitch it in place on the carcass, the bracket 116 engaging in the notch 122 due to the pressure thus preventing creeping of the roller. When the tread has been rolled sufficiently, the roller 118 is quickly shifted away from the tread along the lever 112 by manually engaging the handle 119, and the stitchers 123 are urged against the tire to gradually stitch the tread on both sides into overlapping relation to the side walls. The finishing operations are thus completed, the core being removed from the chuck and another core carrying a carcass being mounted thereon.

The finished tire is then in readiness for delivery to the vulcanizers.

Modifications of my invention may be resorted to without departing from the spirit or scope thereof as claimed in the appended claims.

I claim:

1. A tire-making machine comprising, in combination, a mount for a core adapted to support the same in reversed positions, a strip-guiding device movable into operative relation with the core in either position thereof, and means for driving the core relative to said guiding device in the same direction in either position thereof.

2. A tire-making machine comprising, in combination, a mount for a core adapted to support the same in reversed positions, a tire-shaping device movable onto a side of the core in either position thereof and adapted progressively to apply a composite side wall and chafer strip to the side and about the bead of a carcass on said core, and means for driving the core relative to said shaping device in the same direction in either position thereof.

3. A tire-making machine comprising, in combination, a mount for a core adapted to support the same in a vertical or reversed horizontal positions, means movable onto the core from above when in either horizontal position for progressively applying a composite side-wall and chafer strip to a carcass on said core, and means for driving the core in either direction relative to its mount.

4. A tire-making machine comprising, in combination, a mount for a core adapted to support the same in a vertical or reversed horizontal positions, means movable onto the core from above when in either horizontal position for progressively applying a composite side-wall and chafer strip to a carcass on said core, said means comprising a stitcher adapted to affix the strip to a side of the carcass, a second stitcher adapted to fold the strip about the heel of a bead, and means for driving the core relatively to the applying means in the same direction in both of said horizontal positions.

WILLIAM C. STEVENS.